(12) United States Patent
Nakayama et al.

(10) Patent No.: US 11,631,887 B2
(45) Date of Patent: Apr. 18, 2023

(54) SOLID ELECTROLYTE

(71) Applicant: Mitsui Mining & Smelting Co., Ltd., Tokyo (JP)

(72) Inventors: Yuki Nakayama, Ageo (JP); Tsukasa Takahashi, Ageo (JP); Takahiro Ito, Ageo (JP); Norihiko Miyashita, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 231 days.

(21) Appl. No.: 16/958,241

(22) PCT Filed: Dec. 26, 2018

(86) PCT No.: PCT/JP2018/047756
§ 371 (c)(1),
(2) Date: Jun. 26, 2020

(87) PCT Pub. No.: WO2019/131725
PCT Pub. Date: Jul. 4, 2019

(65) Prior Publication Data
US 2021/0075058 A1    Mar. 11, 2021

(30) Foreign Application Priority Data
Dec. 28, 2017 (JP) .............................. JP2017-253539

(51) Int. Cl.
*H01M 10/00*    (2006.01)
*H01M 10/0562*    (2010.01)
(Continued)

(52) U.S. Cl.
CPC ....... *H01M 10/0562* (2013.01); *H01M 4/382* (2013.01); *H01M 4/386* (2013.01);
(Continued)

(58) Field of Classification Search
CPC .. H01M 10/0562; H01M 4/382; H01M 4/386; H01M 4/583; H01M 10/052;
(Continued)

(56) References Cited

U.S. PATENT DOCUMENTS 9,812,734 B2    11/2017    Miyashita et al.
9,899,701 B2    2/2018    Miyashita et al.
(Continued)

FOREIGN PATENT DOCUMENTS

CN    105518923 B    3/2017
JP    201829058 A    2/2018
(Continued)

OTHER PUBLICATIONS

Boulineau et al., "Mechanochemical Synthesis of Li-argyrodite Li6PS5X (X=Cl, Br, I) as Sulfur-Based Solid Electrolytes for all Solid State Batteries Application", Solid State Ionics, 2012, pp. 1-5, vol. 221.
(Continued)

*Primary Examiner* — Nicholas P D'Aniello
(74) *Attorney, Agent, or Firm* — The Webb Law Firm (57) ABSTRACT

Provided is a sulfide-based solid electrolyte comprising lithium, phosphorus, sulfur, and a halogen, as a novel solid electrolyte capable of suppressing generation of hydrogen sulfide and securing ionic conductivity. The solid electrolyte is characterized by comprising $Li_{7-a}PS_{6-a}Ha_a$ (wherein Ha represents a halogen, and "a" satisfies $0.2 < a \leq 1.8$) having an argyrodite-type crystal structure, and $Li_3PS_4$, wherein, in an X-ray diffraction (XRD) pattern obtained through measurement by an X-ray diffraction method, the ratio of the peak intensity of a peak appearing at a position in a range of diffraction angle $2\theta = 26.0°$ to $28.8°$ derived from $Li_3PS_4$, relative to the peak intensity of a peak appearing at a position in a range of diffraction angle $2\theta = 24.9°$ to $26.3°$
(Continued)

derived from the argyrodite-type crystal structure, is 0.04 to 0.3.

10 Claims, 2 Drawing Sheets

(51) Int. Cl.
*H01M 4/38* (2006.01)
*H01M 4/583* (2010.01)
*H01M 10/052* (2010.01)

(52) U.S. Cl.
CPC ......... *H01M 4/583* (2013.01); *H01M 10/052* (2013.01); *H01M 2300/008* (2013.01)

(58) Field of Classification Search
CPC .... H01M 2300/008; H01M 2300/0068; C01B 25/14; H01B 1/122; H01B 1/10; H01B 1/06; Y02E 60/10
See application file for complete search history.

(56) References Cited

U.S. PATENT DOCUMENTS

| | | |
|---|---|---|
| 9,899,702 B2 | 2/2018 | Miyashita et al. |
| 10,644,348 B2 | 5/2020 | Higuchi et al. |
| 2011/0081580 A1 | 4/2011 | Stadler et al. |
| 2015/0333367 A1* | 11/2015 | Kato ................. C01B 25/14 429/323 |
| 2016/0156064 A1* | 6/2016 | Miyashita .......... C01B 25/14 429/323 |
| 2016/0164136 A1 | 6/2016 | Higuchi et al. |
| 2017/0222257 A1 | 8/2017 | Miyashita et al. |
| 2017/0352916 A1 | 12/2017 | Miyashita et al. |
| 2019/0319305 A1 | 10/2019 | Utsuno et al. |

FOREIGN PATENT DOCUMENTS

| | | |
|---|---|---|
| WO | 2015001818 | 1/2015 |
| WO | 2015012042 | 1/2015 |
| WO | 2016009768 A1 | 1/2016 |
| WO | 2016104702 | 6/2016 |
| WO | 2017108105 A1 | 6/2017 |
| WO | 2018092366 | 5/2018 |

OTHER PUBLICATIONS

Rao et al., "Studies of Lithium Argyrodite Solid Electrolytes for All-Solid-State Batteries", Physica Status Solidi A, 2011, pp. 1804-1807, vol. 208, No. 8.

Ito, et al. "Improvement of lithium Argyrodite solid electrolyte from a practical application stand point of all solid state batter". Nov. 13, 2007, 4 pages.

* cited by examiner

SOLID ELECTROLYTE

CROSS-REFERENCE TO RELATED APPLICATIONS

This application is the United States national phase of International Application No. PCT/JP2018/047756 filed Dec. 26, 2018, and claims priority to Japanese Patent Application No. 2017-253539 filed Dec. 28, 2017, the disclosures of which are hereby incorporated by reference in their entirety.

BACKGROUND OF THE INVENTION

Technical Field

The present invention relates to a solid electrolyte that can be suitably used, for example, as a solid electrolyte for a lithium secondary battery.

Background Art

A lithium secondary battery is a secondary battery having a structure in which lithium dissolves out as ions from a positive electrode at the time of charging and moves to a negative electrode to be stored therein, and conversely, the lithium ions return to the positive electrode from the negative electrode at the time of discharging. Since the lithium secondary battery has characteristics such as high energy density and long service life, it is widely used as a power supply for electric appliances such as a video camera; portable electronic devices such as a laptop computer and a mobile telephone, and electric tools such as a power tool. Recently, the lithium secondary battery is also applied to a large-sized battery that is mounted in an electric vehicle (EV), a hybrid electric vehicle (HEV), and the like.

This kind of lithium secondary battery is constituted of a positive electrode, a negative electrode, and an ion conducting layer inserted between both of the electrodes. Conventionally, as the ion conducting layer, a separator formed of a porous film such as polyethylene or polypropylene, which is filled with a non-aqueous electrolytic solution, is being generally used. However, in such an ion conducting layer, an organic electrolytic solution using a flammable organic solvent as a solvent is being used. Therefore, it is required to improve the structure and material for preventing volatilization and leakage, and also required to install safety devices for suppressing an increase in temperature at the time of short circuits and to improve the structure and material for preventing short circuits.

In contrast, an all-solid lithium secondary battery using a sulfide-based solid electrolyte that uses lithium sulfide ($Li_2S$) or the like as a starting material, does not use a flammable organic solvent. Therefore, not only the safety devices can be simplified and the production cost and productivity can be improved, but also the voltage can be increased by laminating the solid electrolyte in series in the cell. Furthermore, since nothing moves except lithium ions in the solid electrolyte of this kind, it is expected that safety and durability are improved, for example, no side reaction occur due the movement of anions.

As for this kind of sulfide-based solid electrolyte, for example, WO 2015-001818 (Patent Document 1) discloses a crystalline solid electrolyte being represented by a compositional formula: $Li_xSi_yP_zS_aHa_w$ (wherein Ha includes one or two or more of Br, Cl, I, and F, and $2.4<(x-y)/(y+z)<3.3$), wherein the content of S is 55 to 73% by mass, the content of Si is 2 to 11% by mass, and the content of the Ha element is 0.02% by mass or more.

WO 2015-012042 (Patent Document 2) discloses a sulfide-based solid electrolyte for a lithium ion battery, which contains a compound having a cubic crystal structure belonging to a space group F-43m, and being represented by a compositional formula: $Li_{7-x}PS_{6-x}Ha_x$ (Ha represents Cl or Br), wherein x in the compositional formula is 0.2 to 1.8, and a value of the lightness $L^*$ in the $L^*a^*b^*$ color system is 60.0 or more.

WO 2016-104702 (Patent Document 3) discloses a sulfide-based solid electrolyte compound for a lithium ion battery, which contains a crystal phase of a cubic argyrodite-type crystal structure, and is represented by a compositional formula: $Li_{7-x+y}PS_{6-x}Cl_{x+y}$, wherein x and y in the compositional formula satisfy $0.05 \leq y \leq 0.9$ and $-3.0x+1.8 \leq y \leq -3.0x+5.7$.

WO 2016-009768 (Patent Document 4) discloses a sulfide-based solid electrolyte for a lithium ion battery, which contains a compound having a cubic argyrodite-type crystal structure and being represented by a compositional formula: $Li_{7-x-2y}PS_{6-x-y}Cl_x$, wherein, in the compositional formula, conditions of $0.8 \leq x \leq 1.7$ and $0 \leq y \leq -0.25x+0.5$ are satisfied.

SUMMARY OF THE INVENTION

Problem to be Solved by the Invention

A sulfide-based solid electrolyte containing lithium, phosphorus, and sulfur has a high ionic conductivity, but has a problem in that, when exposed to moisture in the air, hydrogen sulfide is generated and the ionic conductivity is lowered. In particular, it has been found that when a halogen is contained in this kind of sulfide-based solid electrolyte, the ionic conductivity is further enhanced, but hydrogen sulfide is further generated.

Thus, the present invention relates to a sulfide-based solid electrolyte containing a halogen in addition to lithium, phosphorus, and sulfur; and is intended to provide a novel solid electrolyte capable of suppressing generation of hydrogen sulfide while securing ionic conductivity.

Means for Solving Problem

The present invention proposes a solid electrolyte comprising $Li_{7-a}PS_{6-a}Ha_a$ (wherein Ha represents a halogen, and "a" satisfies $0.2<a \leq 1.8$) having an argyrodite-type crystal structure, and $Li_3PS_4$, wherein, in an X-ray diffraction (XRD) pattern obtained through measurement by an X-ray diffraction method, the ratio of the peak intensity of a peak appearing at a position in a range of diffraction angle $2\theta=26.0°$ to $28.8°$ derived from $Li_3PS_4$, relative to the peak intensity of a peak appearing at a position in a range of diffraction angle $2\theta=24.9°$ to $26.3°$ derived from the argyrodite-type crystal structure, is 0.04 to 0.3.

Effect of the Invention

The solid electrolyte proposed by the present invention is able to suppress generation of hydrogen sulfide while securing ionic conductivity. Thus, the solid electrolyte is easy to be industrially utilized since the generation of hydrogen sulfide and the deterioration of quality can be suppressed even when exposed to dry air, for example, in a dry room (typically, a moisture concentration of 100 ppm or less and a dew point of $-45°$ C. or less). Also, when a battery is produced using the solid electrolyte proposed by the present invention, the production work can be performed with simpler equipment and protective tools, so that safety and mass productivity can be enhanced.

DETAILED DESCRIPTION

Next, the present invention will be described based on exemplary embodiments. However, the present invention is not limited to the embodiments that will be described below.

<Present Solid Electrolyte>

The solid electrolyte according to an example of the embodiment of the present invention (referred to as "present solid electrolyte") is a solid electrolyte containing a compositional formula (1): $Li_{7-a}PS_{6-a}Ha_a$ (wherein Ha represents a halogen, and "a" satisfies $0.2<a\leq1.8$) having an argyrodite-type crystal structure, and a compositional formula (2): $Li_3PS_4$.

Here, the "argyrodite-type crystal structure" means a crystal structure of a group of compounds derived from a mineral represented by a chemical formula: $Ag_8GeS_6$.

As compounds represented by the "$Li_3PS_4$", $\alpha$-$Li_3PS_4$, $\beta$-$Li_3PS_4$, and $\gamma$-$Li_3PS_4$ are known. When the "$Li_3PS_4$" is described in the present invention, it is meant to include all of these compounds unless otherwise specified. Therefore, the present solid electrolyte may contain only one of $\alpha$-$Li_3PS_4$, $\beta$-$Li_3PS_4$, and $\gamma$-$Li_3PS_4$ as the $Li_3PS_4$, may contain two of them, or may contain all three of them. Here, the type of the $Li_3PS_4$ contained in the present solid electrolyte can be confirmed, for example, with an X-ray diffraction (XRD) pattern obtained through measurement by an XRD method. Specifically, in the X-ray diffraction pattern, the presence of $\alpha$-$Li_3PS_4$ can be confirmed by the appearance of a peak derived from the $\alpha$ phase, the presence of $\beta$-$Li_3PS_4$ can be confirmed by the appearance of a peak derived from the $\beta$ phase, and the presence of $\gamma$-$Li_3PS_4$ can be confirmed by the appearance of a peak derived from the $\gamma$ phase.

In the present invention, when the ratio of any one of the $\alpha$ phase ($\alpha$-$Li_3PS_4$), $\beta$ phase ($\beta$-$Li_3PS_4$), and $\gamma$ phase ($\gamma$-$Li_3PS_4$) present in the $Li_3PS_4$ is 65% or more in terms of molar ratio, the $Li_3PS_4$ is evaluated as a single phase of the relevant phase, that is, the phase occupying 65 mol % or more of the $Li_3PS_4$.

On the other hand, when the ratio of any one of the $\alpha$ phase ($\alpha$-$Li_3PS_4$), $\beta$ phase ($\beta$-$Li_3PS_4$), and $\gamma$ phase ($\gamma$-$Li_3PS_4$) present in the $Li_3PS_4$ is less than 65% in terms of molar ratio, the $Li_3PS_4$ is evaluated as a mixed phase of two or three of the $\alpha$ phase, $\beta$ phase, and $\gamma$ phase.

In the compositional formula (1), the "a" representing the molar ratio of the halogen element is preferably larger than 0.2 and 1.8 or less.

The "a" is preferably larger than 0.2 since the cubic argyrodite-type crystal structure becomes stable at near room temperature, and a high ionic conductivity can be secured; and the "a" is preferably 1.8 or less since the generation amount of $Li_3PS_4$ can be easily controlled, and the conductivity of lithium ions can be enhanced.

From such a viewpoint, the "a" is preferably larger than 0.2 and 1.8 or less, more preferably 0.4 or more or 1.7 or less, and even more preferably 0.5 or more or 1.65 or less.

Here, when the halogen (Ha) is a combination of Cl and Br, the "a" in the compositional formula (1) is a total value of the molar ratio of the elements Cl and Br.

As for the present solid electrolyte, in the X-ray diffraction (XRD) pattern obtained by XRD measurement using CuKα rays, the ratio of the peak intensity of a peak appearing at a position in a range of diffraction angle $2\theta=26.0°$ to $28.8°$ derived from $Li_3PS_4$, relative to the peak intensity of a peak appearing at a position in a range of diffraction angle $2\theta=24.9°$ to $26.3°$ derived from the argyrodite-type crystal structure, is preferably 0.04 to 0.3. The ratio is preferably 0.04 or more since the generation amount of hydrogen sulfide can be reduced by the presence of $Li_3PS_4$; and the ratio is preferably 0.3 or less since a practicable conductivity can be secured.

Thus, from such a viewpoint, the ratio is preferably 0.04 to 0.3, more preferably 0.06 or more or 0.2 or less, and even more preferably 0.065 or more or 0.1 or less.

Here, the "peak intensity" means a value of the count number (cps) of a peak having the largest count number (cps) of X-ray photons in the range of the diffraction angle $2\theta$.

For example, when $Li_3PS_4$ is a single phase composed of a $\beta$ phase ($\beta$-$Li_3PS_4$) or a $\gamma$ phase ($\gamma$-$Li_3PS_4$), the count number (cps) of a peak that has the largest count number (cps) of X-ray photons in the range of the diffraction angle $2\theta=26.0°$ to $28.8°$ and that is derived from the $\beta$ phase ($\beta$-$Li_3PS_4$) or the $\gamma$ phase ($\gamma$-$Li_3PS_4$), is the peak intensity of $Li_3PS_4$.

In addition, when $Li_3PS_4$ is a mixed phase of a $\beta$ phase ($\beta$-$Li_3PS_4$) and a $\gamma$ phase ($\gamma$-$Li_3PS_4$), the count number (cps) of a peak that has the largest count number (cps) of X-ray photons in the range of the diffraction angle $2\theta=26.0°$ to $28.8°$ and that is derived from the $\beta$ phase ($\beta$-$Li_3PS_4$) or the $\gamma$ phase ($\gamma$-$Li_3PS_4$), is the peak intensity of $Li_3PS_4$.

In the XRD measurement using CuKα rays, the peak appearing at a position in a range of diffraction angle $2\theta=24.9°$ to $26.3°$ is a peak on the (220) plane derived from the argyrodite-type crystal structure.

Further, examples of the peak appearing at a position in a range of diffraction angle $2\theta=26.0°$ to $28.8°$ in the XRD measurement using CuKα rays may include peaks of the (121) plane, the (311) plane, and the (400) plane derived from $\beta$-$Li_3PS_4$; and peaks of the (210) plane and the (020) plane derived from $\gamma$-$Li_3PS_4$. Therefore, when the present solid electrolyte contains $\beta$-$Li_3PS_4$, peaks of the (121) plane, the (311) plane, and the (400) plane appear at positions in a range of diffraction angle $2\theta=26.0°$ to $28.8°$ in the XRD measurement of the present solid electrolyte. Also, when the present solid electrolyte contains $\gamma$-$Li_3PS_4$, peaks of the (210) plane and the (020) plane appear at positions in a range of diffraction angle $2\theta=26.0°$ to $28.8°$ in the XRD measurement of the present solid electrolyte.

The present solid electrolyte is a sulfide-based solid electrolyte containing lithium, phosphorus, sulfur, and a halogen, and it can be considered that any of the solid electrolytes is able to provide the same effect when having the above characteristics.

Among them, as a preferable composition example of the present solid electrolyte, a compound represented by a compositional formula (3): $Li_{7-x-y}PS_{6-x}Ha_{x-y}$ (wherein Ha represents a halogen and is Cl or Br, or a combination of both; and x and y are numerical values satisfying predetermined numerical ranges and relationship) can be exemplified. However, the present solid electrolyte is not limited to the compound represented by the compositional formula (3). Here, the "compositional formula (3)" is a compositional formula based on the molar ratio of each element obtained by completely dissolving the present solid electrolyte and measuring the amount of each element. For example, when the present solid electrolyte is a mixed phase of the compound represented by $Li_3PS_4$ and the compound represented by $Li_{7-a}PS_{6-a}Ha_a$, the compositional formula can be determined as a total value according to the molar ratio of each compound.

The "x" in the compositional formula (3) preferably satisfies $0.2 < x \leq 1.8$.

The "x" is preferably larger than 0.2 since a high ionic conductivity can be secured; and the "x" is preferably 1.8 or less since the generation amount of $Li_3PS_4$ can be easily controlled. From such a viewpoint, the "x" is preferably $0.2 < x \leq 1.8$, more preferably 0.5 or more, even more preferably 0.6 or more or 1.7 or less, and still more preferably 0.8 or more or 1.6 or less.

In the case where the halogen (Ha) is chlorine (Cl) alone, the "x" in the compositional formula (3) preferably satisfies $0.65 < x \leq 1.8$, and the "y" in the compositional formula (3) preferably satisfies $(-x/3+2/3) < y < (-x/3+1.87)$ and $y < x-0.2$. In the case where the halogen (Ha) is chlorine (Cl) alone, when the "y" satisfies $(-x/3+2/3) < y$ under the condition of $y < x-0.2$, the conductivity can be secured while reducing the generation amount of hydrogen sulfide. Further, the "y" preferably satisfies $y < (-x/3+1.87)$ since a high discharge capacity can be exhibited when producing an all-solid battery using the present solid electrolyte.

From such a viewpoint, in the case where the halogen (Ha) is chlorine (Cl) alone, the "y" preferably satisfies $(-x/3+2/3) < y < (-x/3+1.87)$, more preferably $(-x/3+5/6) < y$ or $y < (-x/3+1.8)$, even more preferably $y < (-x/3+1.7)$, and still more preferably $(-x/3+1) < y$ or $y < (-x/3+1.6)$, under the condition of $y < x-0.2$.

In the case where the halogen (Ha) is Br alone or a combination of Cl and Br, the "y" in the compositional formula (3) preferably satisfies $0 < y < (-x/3+1.87)$ and $y < x-0.2$. In the case where the halogen (Ha) is Br alone or a combination of Cl and Br, when the "y" satisfies $0 < y$ under the condition of $y < x-0.2$, the conductivity can be secured while reducing the generation amount of hydrogen sulfide. Further, the "y" preferably satisfies $y < (-x/3+1.87)$ since a high discharge capacity can be exhibited when producing an all-solid battery using the present solid electrolyte.

From such a viewpoint, in the case where the halogen (Ha) is Br alone or a combination of Cl and Br, the "y" preferably satisfies $0 < y < (-x/3+1.87)$, more preferably $(-x/3+2/3) < y$, even more preferably $(-x/3+5/6) < y$ or $y < (-x/3+1.8)$, still more preferably $y < (-x/3+1.7)$, and particularly preferably $(-x/3+1) < y$ or $y < (-x/3+1.6)$, under the condition of $0.2 < x-y < 1.8$.

Here, in the case where the halogen (Ha) is a combination of Cl and Br, the "x-y" in the compositional formula (3) is a total value of the molar ratio of the elements Cl and Br.

The present solid electrolyte preferably contains a compound represented by the compositional formula (1): $Li_{7-a}PS_{6-a}Ha_a$ in a molar ratio of 30% or more, more preferably 40% or more or 95% or less, and even more preferably 50% or more or 90% or less, relative to the whole compounds in the present solid electrolyte. Also, the present solid electrolyte preferably contains a compound represented by the compositional formula (2): $Li_3PS_4$ in a molar ratio of 3% or more, more preferably 5% or more or 60% or less, and even more preferably 10% or more or 50% or less, relative to the whole compounds in the present solid electrolyte.

As a breakdown of the compound represented by $Li_3PS_4$, the present solid electrolyte preferably contains $\beta$-$Li_3PS_4$ in 50 mol % or more, more preferably 60 mol % or more, and even more preferably 70 mol % or more.

Here, the molar ratio (%) of the compound can be determined by Rietveld analysis of the XRD data.

Even when the present solid electrolyte contains materials other than the above, such as unavoidable impurities, the content is preferably less than 5 mol %, more preferably less than 3 mol %, and even more preferably less than 1 mol % relative to the amount of the present solid electrolyte, from the viewpoint of lowering an influence on the performance.

(Particle Diameter)

The present solid electrolyte is preferably a particle, and preferably has a D50 in a volume-based particle size distribution obtained via measurement by a laser diffraction scattering-type particle size distribution measurement method (referred to as "average particle diameter (D50)" or "D50") of 0.1 to 10 μm. The D50 of the present solid electrolyte is preferably 0.1 μm or more since no increase in resistance due to increase in the surface area of the solid electrolyte particles and no difficulty in mixing with active materials. In addition, the D50 is preferably 10 μm or less since the present solid electrolyte is easily entered into the gap of active materials or solid electrolytes to be used in combination, thereby increasing the contact point and the contact area.

From such a viewpoint, the average particle diameter (D50) of the present solid electrolyte is preferably 0.1 to 10 μm, more preferably 0.3 μm or more or 7 μm or less, and even more preferably 0.5 μm or more or 5 μm or less.

The average particle diameter (D50) in the case where the present solid electrolyte is added into the electrodes is preferably 1 to 100% of the average particle diameter (D50) of the positive electrode active material or the average particle diameter (D50) of the negative electrode active material. The average particle diameter (D50) of the present solid electrolyte is preferably 1% or more of the average particle diameter (D50) of the positive electrode active material or the average particle diameter (D50) of the negative electrode active material since the space between the active materials can be filled without gaps. In addition, the average particle diameter (D50) of the present solid electrolyte is preferably 100% or less, from the viewpoint of increasing the energy density of batteries, since the active material ratio can be enhanced while increasing the electrode filling ratio.

From such a viewpoint, the average particle diameter (D50) of the present solid electrolyte is preferably 1 to 100% of the average particle diameter (D50) of the positive electrode active material or the average particle diameter (D50) of the negative electrode active material, more preferably 3% or more or 50% or less thereof, and even more preferably 5% or more or 30% or less thereof.

<Method for Producing Present Solid Electrolyte>

Next, an example of the method for producing the present solid electrolyte will be described. However, the production method described herein is merely an example, and the present invention is not limited to this method.

As an example of a preferred method for producing the present solid electrolyte, at first, it is preferable to weigh, for example, a lithium sulfide ($Li_2S$) powder, a phosphorus sulfide ($P_2S_5$) powder, and a halogen compound powder, respectively, and to pulverize and mix the powders with a ball mill, a bead mill, a homogenizer, or the like. However, the present invention is not limited to this production method.

At this time, the mixing is performed by weighing the material powders so as to be y>0 in the compound represented by the compositional formula (3): $Li_{7-x-y}PS_{6-x}Ha_{x-y}$, so that the phase of the argyrodite-type structure represented by the compositional formula (1): $Li_{7-a}PS_{6-a}Ha_a$ and the phase of the compositional formula (2): $Li_3PS_4$ can be formed into a mixed phase state. Furthermore, by adjusting y within the above preferred range, the ratio of the peak intensity of a peak appearing at a position in a range of diffraction angle 2θ=26.0° to 28.8° derived from $Li_3PS_4$, relative to the peak intensity of a peak appearing at a position in a range of diffraction angle 2θ=24.9° to 26.3° derived from the argyrodite-type crystal structure, can be in a range of 0.04 to 0.3.

Examples of the halogen compound may include lithium chloride (LiCl) and lithium bromide (LiBr).

After mixing the material powders as described above, the mixed powder is dried as necessary, and is subsequently calcined in an inert atmosphere or under the flow of a hydrogen sulfide gas ($H_2S$) stream. The resulting product is then crushed or pulverized as necessary, and is classified as necessary, thereby obtaining a solid electrolyte.

A sulfide material is likely to generate sulfur deficiency when the temperature rises, and thus the sulfide material is conventionally calcined by enclosing with a quartz sample or the like. However, it is then difficult to produce a solid electrolyte in an industrial scale. Furthermore, since the enclosed quartz sample is tightly sealed, there is a risk that the gas contained in the quartz sample is expanded by heating, the pressure inside the quartz sample is increased, and then the quartz sample is broken. Therefore, it is necessary to keep a vacuum state as far as possible at the time of enclosing. However, in the state of vacuum, sulfur deficiency may easily occur in the sulfide material.

In contrast, the present solid electrolyte is crystallized from a relatively low temperature range of about 200° C. to 300° C. Therefore, the present solid electrolyte is preferably calcined at 350° C. or more after performing pre-heating in the above-mentioned low temperature range under an inert atmosphere or under the flow of a hydrogen sulfide gas ($H_2S$) stream. By doing so, the crystallization is stabilized, and the present solid electrolyte, which is a sulfide having a target chemical composition having almost no sulfur deficiency, can be produced more reliably.

Above all, when using a hydrogen sulfide gas at the time of calcining, the sulfur partial pressure near the calcined sample can be increased by a sulfur gas generated by decomposing hydrogen sulfide at the time of calcining. Therefore, the sulfur deficiency is hardly occurred even at a high calcining temperature, and the electron conductivity can be lowered. Accordingly, when calcining under an atmosphere containing a hydrogen sulfide gas, the calcination temperature is preferably set to 350° C. to 650° C., more preferably 450° C. or higher or 600° C. or lower, and even more preferably 500° C. or higher or 550° C. or lower.

As such, when calcining under the flow of a hydrogen sulfide gas ($H_2S$) stream, the present solid electrolyte can be calcined without losing sulfur in the sulfide by calcining at 350° C. to 650° C.

Meanwhile, when calcining under an inert atmosphere, unlike the case of the hydrogen sulfide gas, the sulfur partial pressure near the calcined sample cannot be increased at the time of calcining. Therefore, in the case of high calcination temperature, the sulfur deficiency may be easily generated, and the electron conductivity is increased. For this reason, when calcining under an inert atmosphere, the calcination temperature is preferably set to 350° C. to 500° C., more preferably 350° C. or higher or 450° C. or lower, and even more preferably 400° C. or higher or 450° C. or lower.

Generally, in order to eliminate any unreacted phase by causing the raw material powders to completely react, it is preferable to calcine the present solid electrolyte at 500° C. or higher while flowing a hydrogen sulfide gas stream. However, in the case of using raw material powders having small particle diameters and high reactivity, the reaction is accelerated even at a low temperature, and thus the calcination may be performed even under an inert atmosphere. Furthermore, the raw materials described above are very unstable in the air and thus react with moisture to be decomposed, thereby generating a hydrogen sulfide gas or undergoing oxidation. Therefore, the calcination is preferably performed by placing the raw materials in a furnace through a glove box or the like purged with an inert gas atmosphere.

By producing the present solid electrolyte as described above, the generation of the sulfur deficiency can be suppressed, and the electron conductivity can be lowered. Accordingly, when an all-solid lithium secondary battery is produced using the present solid electrolyte, the battery characteristics such as charge-discharge characteristics and cycle characteristics can be improved.

<Applications of Present Solid Electrolyte>

The present solid electrolyte is a solid body that allows ions such as Li ions to pass through, and has high chemical stability. Therefore, the present solid electrolyte can be formed into slurry using a polar solvent such as N-methyl-2-pyrrolidone (NMP), acetone, or DMF. Furthermore, the conductivity after immersing in the solvent can be maintained in a high level. Specifically, the conductivity after immersing in NMP can be $1 \times 10^{-5}$ S/cm or more.

The present solid electrolyte can be used as a solid electrolyte layer of an all-solid lithium secondary battery, or as a solid electrolyte that is mixed with a positive or negative electrode mixture.

Examples of the shape of the battery may include a laminate-type, a cylindrical-type, and a square-type.

For example, an all-solid lithium secondary battery can be constituted by forming a layer containing the present solid electrolyte between the positive electrode and the negative electrode.

In so doing, the present solid electrolyte is excellent in moisture resistance, and has little characteristic degradation even when handed in dry air. Therefore, all-solid lithium secondary batteries can be assembled even in, for example, a dry room or the like.

Here, the layer containing the present solid electrolyte can be produced by, for example, a method in which a slurry composed of the present solid electrolyte, a binder, and a solvent is dropped on a substrate, and rubbed and cut with a doctor blade or the like, a method of cutting with an air knife after contacting the substrate with the slurry, and a method in which a coating film is formed by a screen printing method or the like, and the solvent is then removed through heating and drying processes. Alternatively, the layer can also be produced in such a manner that powders of the present solid electrolyte are pressed by a press or the like to obtain pressed powders, and the pressed powders are appropriately processed.

From the viewpoint of enhancing the lithium ionic conductivity, the layer containing the present solid electrolyte preferably has a porosity of 50% or less, more preferably 30% or less, and even more preferably 20% or less. Thus, the present solid electrolyte is preferably produced by pressing the powder of the present solid electrolyte at 20 MPa or more.

Here, the porosity can be calculated from true density and apparent density of the layer containing the present solid electrolyte, which are obtained by a liquid-phase method (Archimedes method), according to a relational formula described below.

Porosity=(true density−apparent density)÷true density×100

In addition, the thickness of the layer containing the present solid electrolyte is typically preferably 5 to 300 μm, and more preferably 10 μm or more or 100 μm or less, from the viewpoint of balance between short circuit prevention and capacity.

The present solid electrolyte can also be used as a solid electrolyte layer obtained by mixing the present solid electrolyte and the other solid electrolyte. Specific examples thereof may include $Li_2S$—$P_2S_5$ series, $Li_4P_2S_6$, and $Li_7P_3S_{11}$.

As for the positive electrode material, a positive electrode material used as a positive electrode active material for lithium secondary batteries can be appropriately used. For example, a positive electrode active material containing lithium, specifically, a spinel-type lithium transition metal compound, a lithium metal oxide having a layered structure, and the like can be cited. By using a high-voltage system positive electrode material, improvement of the energy density can be attempted.

The positive electrode material may contain a conductive material or other materials in addition to the positive electrode active material.

As for the negative electrode material, a negative electrode material used as a negative electrode active material for lithium secondary batteries can be appropriately used. Since the present solid electrolyte is electrochemically stable, a carbon-based material such as graphite, artificial graphite, natural graphite, or non-graphitizing carbon (hard carbon), all of which are charged and discharged at a low potential comparable to that of lithium metal (about 0.1 V vs. $Li^+/Li$), can be used. Thus, the energy density of all-solid lithium ion batteries can be greatly improved. In addition, silicon or tin promising as a high capacity material can also be used as the active substance. In a lithium secondary battery using a general electrolytic solution, the electrolytic solution is reacted with the active material as the battery is charged and discharged, and corrosion occurs on the surface of the active material, so that the battery characteristics are remarkably deteriorated. When the present solid electrolyte is used as the electrolyte of the lithium secondary battery and silicon or tin is used for the negative electrode, such a corrosion reaction does not occur, and thus the durability of the battery can be improved.

The negative electrode material may also contain a conductive material or other materials in addition to the negative electrode active material.

<Explanation of Terms>

The term "solid electrolyte" in the present invention means any kind of material in which ions such as $Li^-$ can move around in a solid state.

In the case of being described as the term "X to Y" (X and Y are arbitrary numbers) in the present invention, unless otherwise stated, the term includes the meaning of "preferably more than X" or "preferably less than Y" along with the meaning "not less than X and not more than Y".

Furthermore, in the case of being described as the term "X or more" or "X≤" (X is an arbitrary number), the term also includes the intention of being "preferably more than X"; and in the case of being described as the term "Y or less" or "Y≤" (Y is an arbitrary number), the term also includes the intention of being "preferably less than Y".

EXAMPLES

The present invention will be further described in detail with reference to Examples and Comparative Examples below.

Example 1

In order to adjust the composition of a compound having a cubic argyrodite-type crystal structure to $Li_{5.0}PS_{4.4}Cl_{1.2}$, a lithium sulfide ($Li_2S$) powder, a diphosphorus pentasulfide ($P_2S_5$) powder, and a lithium chloride (LiCl) powder were respectively weighed so as to be 5 g in total amount, and then pulverized and mixed with a ball mill for 15 hours. The resulting mixed powder was filled in a container made of carbon, heated at 300° C. for 4 hours while allowing a hydrogen sulfide gas to flow at 1.0 l/min in a tubular electric furnace, and then further heated at 500° C. for 4 hours. The temperature rise and fall rate was set to 200° C./h. Subsequently, the sample was crushed in a mortar, and sieved through a sieve having an aperture diameter of 53 μm to obtain a powdery sample. At this time, all of the weighing, mixing, setting into an electric furnace, taking out from the electric furnace, crushing, and sieving were performed in a glove box purged with an Ar gas (dew point of −60° C. or lower) that was sufficiently dried, thereby obtaining a compound powder (sample) represented by a compositional formula: $Li_{5.0}PS_{4.4}Cl_{1.2}$, that is, "x=1.6, y=0.4" in $Li_{7-x-y}PS_{6-a}Ha_{x-y}$.

Examples 2 and 3, and Comparative Examples 1 and 4

A compound powder (sample) was obtained in the same manner as in Example 1 except that the lithium sulfide ($Li_2S$) powder, the diphosphorus pentasulfide ($P_2S_5$) powder, and the lithium chloride (LiCl) powder were weighed and mixed so as to have the composition shown in Table 1.

Examples 4 to 6 and Comparative Example 2

A compound powder (sample) was obtained in the same manner as in Example 1 except that the lithium sulfide ($Li_2S$) powder, the diphosphorus pentasulfide ($P_2S_5$) powder, and the lithium chloride (LiCl) powder were weighed and mixed so as to have the composition shown in Table 2.

Examples 7 and 9, and Comparative Example 3

A compound powder (sample) was obtained in the same manner as in Example 1 except that the lithium sulfide (Li$_2$S) powder, the diphosphorus pentasulfide (P$_2$S$_5$) powder, the lithium chloride (LiCl) powder, and a lithium bromide (LiBr) powder were weighed and mixed so as to have the composition shown in Table 3.

Example 8

A compound powder (sample) was obtained in the same manner as in Example 1 except that the lithium sulfide (Li$_2$S) powder, the diphosphorus pentasulfide (P$_2$S$_5$) powder, the lithium chloride (LiCl) powder, and a lithium bromide (LiBr) powder were weighed and mixed so as to have the composition shown in Table 3, and the calcination was performed at a temperature of 400° C. for 4 hours.

Comparative Examples 5 to 7

A compound powder (sample) was obtained in the same manner as in Example 1 except that the lithium sulfide (Li$_2$S) powder and the diphosphorus pentasulfide (P$_2$S$_5$) powder were weighed and mixed so as to have the composition shown in Table 4.

<Measurement of Element Composition>

The compound powder (sample) obtained in each of Examples and Comparative Examples was completely dissolved, and the element composition was measured by ICP emission spectrometry. It was confirmed that the compound powder (sample) had the compositional formula shown in each of Tables 1 to 4.

Figure 2:
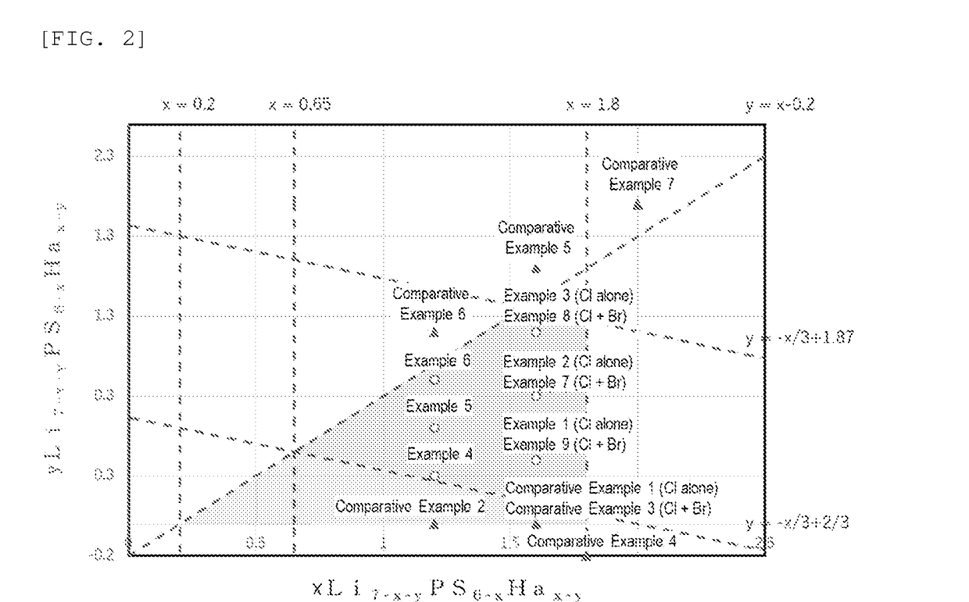
FIG. 2 is a diagram showing a composition range (range of x and y) of a compound powder (sample) obtained in each of Examples and Comparative Examples.

FIG. 2 shows the composition range (range of x and y) of the compound powder (sample) obtained in each of Examples 1 to 9 and Comparative Examples 1 to 7.

<X-Ray Diffraction Measurement>

The compound powder (sample) obtained in each of Examples and Comparative Examples was analyzed by an X-ray diffraction (XRD, Cu ray source) method to obtain an X-ray diffraction pattern, and the peak intensity (cps) at each position was measured.

Figure 1:
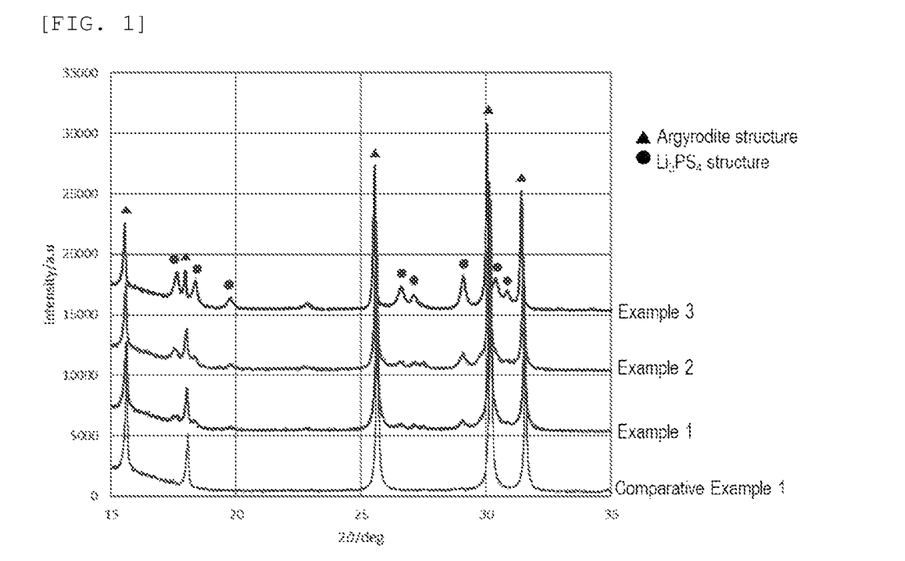
FIG. 1 shows an XRD spectrum of a compound powder (sample) obtained in each of Examples 1 to 3 and Comparative Example 1.
Figure 4:
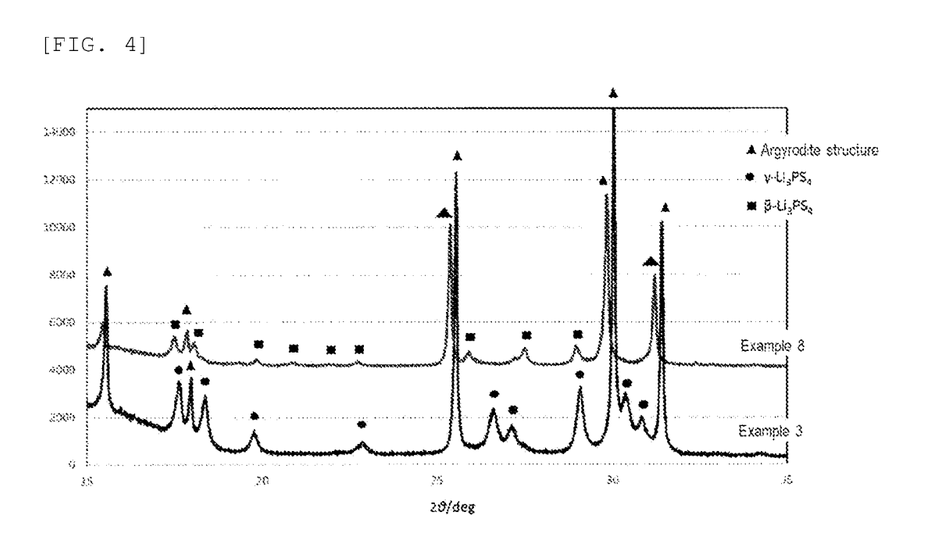
FIG. 4 shows an XRD spectrum of a compound powder (sample) obtained in each of Examples 3 to 8.

FIG. 1 shows the XRD spectrum of the compound powder (sample) obtained in each of Examples 1 to 3 and Comparative Example 1, and FIG. 4 shows the XRD spectrum the compound powder (sample) obtained in each of Examples 3 to 8.

The measurement was performed using an XRD apparatus "SmartLab" manufactured by Rigaku Corporation under the conditions of a scanning axis of 2θ/θ, a scanning range of 10 to 140 deg, a step width of 0.01 deg, and a scanning speed of 1 deg/min. The ratio (Int(Li$_3$PS$_4$)/(Int(Li$_{7-a}$PS$_{6-a}$Ha$_a$))) of the peak intensity of a peak appearing at a position in a range of diffraction angle 2θ=26.0° to 28.8° derived from Li$_3$PS$_4$, relative to the peak intensity of a peak appearing at a position in a range of diffraction angle 2θ=24.9° to 26.3° derived from the argyrodite-type crystal structure, is shown in Tables 1 to 4.

Here, in the case where the ratio is less than 0.04, it is considered that the phase of Li$_3$PS$_4$ is not substantially present with respect to Li$_{7-a}$PS$_{6-a}$Ha$_a$, and "none" is described in the column of "Contained phase other than argyrodite phase" in each table.

<X-Ray Rietveld Analysis>

The following Rietveld analysis was performed using the XRD data of the compound powder (sample) obtained in each Example, and the molar ratio of the compound having an argyrodite-type crystal structure to the whole compound obtained in each Example was determined. It can be confirmed that the molar ratio was 30 mol % or more in each case.

In addition, the following Rietveld analysis was similarly performed using the XRD data of the compound powder (sample) obtained in Example 1, and the composition of the compound having an argyrodite-type crystal structure was quantified. As a result, the compositional formula was Li$_{5.55}$PS$_{4.51}$Cl$_{1.53}$. This value was well matched with the compositional formula: Li$_{5.5}$PS$_{4.5}$Cl$_{1.5}$ (that is, "a=1.5" in Li$_{7-a}$PS$_{6-a}$Ha$_a$) calculated from the blending ratio of the charged raw material compounds. Thus, the value of "a" in the composition: Li$_{7-a}$PS$_{6-a}$Ha$_a$ of the compound having an argyrodite-type crystal structure was calculated from the blending ratio of the charged raw material compounds of the compound powder (sample) obtained in each of Examples and Comparative Examples, and shown in Tables 1 to 4.

The Rietveld analysis was performed with analysis software "RIETAN-FP v2.8.3" using the XRD data measured under the above conditions. Here, the validity was judged with indices Rwp<10 and S<2.0.

<Measurement of Generation Amount of Hydrogen Sulfide (H$_2$S)>

The compound powder (sample) obtained in each of Examples and Comparative Examples was weighed 50 mg each in a glove box purged with a sufficiently dried Ar gas (dew point of −60° C. or less), and was put in a bag sealed with a laminate film. Thereafter, a separable flask made of glass having a capacity of 1,500 cm$^3$ was put in a constant temperature and humidity chamber maintained at room temperature (25° C.) in a −30° C. dew point atmosphere adjusted by mixing a dry air gas and the air, and was left to stand such that the inside of the separable flask became the same environment as in the constant temperature and humidity chamber. Then, the sealed bag containing the sample was opened in the constant temperature and humidity chamber, and the sample was placed in the separable flask quickly. As for hydrogen sulfide generated in 60 minutes just after placing the sample in the separable flask and sealing, the concentration of hydrogen sulfide was measured using a hydrogen sulfide sensor (GX-2009, manufactured by Riken Keiki Co., Ltd.). Then, the volume of hydrogen sulfide was calculated from the concentration of hydrogen sulfide after a lapse of 60 minutes to obtain the generation amount of hydrogen sulfide.

In Tables 1 to 3, the ratio of the generation amount of hydrogen sulfide when the composition is shifted (that is, y≠0) with reference to the generation amount of hydrogen sulfide of the composition when "y=0", in the compositional formula of argyrodite-type crystal structure: Li$_{7-x-y}$PS$_{6-x}$Ha$_{x-y}$, is shown (described as "Ratio of generation amount of hydrogen sulfide relative to argyrodite reference composition" in each Table). In the case where y>0, it can be confirmed that the generation amount of hydrogen sulfide was reduced.

<Measurement of Ionic Conductivity>

The compound powder (sample) obtained in each of Examples and Comparative Examples was subjected to a uniaxial press molding in a glove box purged with a sufficiently dried Ar gas (dew point of −60° C. or less), and was further subjected to a CIP (cold isostatic pressing) molding at 200 MPa with a CIP apparatus to produce a pellet having a diameter of 10 mm and a thickness of about 4 to 5 mm. Further, a carbon paste as an electrode was applied to both top and bottom surfaces of the pellet, and then heat-treated at 180° C. for 30 minutes to produce a sample for measuring ionic conductivity.

The ionic conductivity (S/cm) was measured at room temperature (25° C.) using a Solartron 1255B as an apparatus manufactured by TOYO corporation under the condition of a measuring frequency of 0.1 Hz to 1 MHz by an alternating current impedance method. The results are shown in Tables 1 to 4.

<Production and Evaluation of all-Solid Battery Cell>

The compound powder (sample) obtained in each of Examples 1 and 3 was used as a solid electrolyte to prepare a positive electrode mixture and a negative electrode mixture, and an all-solid battery was produced to evaluate the battery characteristics (initial charge-discharge capacity).

(Materials)

A $LiNi_{0.5}Co_{0.2}Mn_{0.3}O_2$ (NCM) powder (D50=6.7 μm), which is a layered compound, was used as the positive electrode active material, a graphite powder (D50=20 μm) was used as the negative electrode active material, and the sample obtained in each Example was used as the solid electrolyte powder.

(Electrode Mixture Preparation)

A positive electrode mixture powder was prepared by mixing the positive electrode active material powder, the solid electrolyte powder, and a conductive additive (acetylene black) powder in a mortar at a mass ratio of 60:37:3, and subjected to a uniaxial press molding at 20 MPa to obtain a positive electrode mixture pellet.

A negative electrode mixture powder was prepared by mixing the graphite powder and the solid electrolyte powder in a mortar at a mass ratio of 64:36.

(Production of All-Solid Battery Cell)

The lower opening part of a cylinder (opening diameter of 10.5 mm, height of 18 mm) made of polypropylene, in which the upper and lower sides were opened, was closed with a positive electrode (SUS), and the positive electrode mixture pellet was placed on the positive electrode. The solid electrolyte powder obtained in each Example was placed thereon, and uniaxially pressed at 180 MPa to form a positive electrode mixture and a solid electrolyte layer. Then, the negative electrode mixture powder was placed thereon, and the cylinder was closed with a negative electrode (SUS); and the system was uniaxially molded at 550 MPa to produce an all-solid battery cell having a three-layered structure of the positive electrode mixture having a thickness of about 100 μm, the solid electrolyte layer having a thickness of about 300 μm, and the negative electrode mixture having a thickness of about 20 μm. At this time, the production of the all-solid battery cell was performed in a glove box purged with dry air having an average dew point of −45° C.

(Battery Characteristics Evaluation (Initial Charge-Discharge Capacity))

The battery characteristics were evaluated by placing the all-solid battery cell into an environmental tester maintained at 25° C. and connecting with a charge-discharge measurement apparatus. In charging and discharging the battery, 1 mA was defined as 1 C. The charge was performed up to 4.5 V at 0.1 C by the CC-CV mode to obtain the initial charge capacity. The discharge was performed up to 2.5 V at 0.1 C by the CC mode to obtain the initial discharge capacity.

Figure 3:
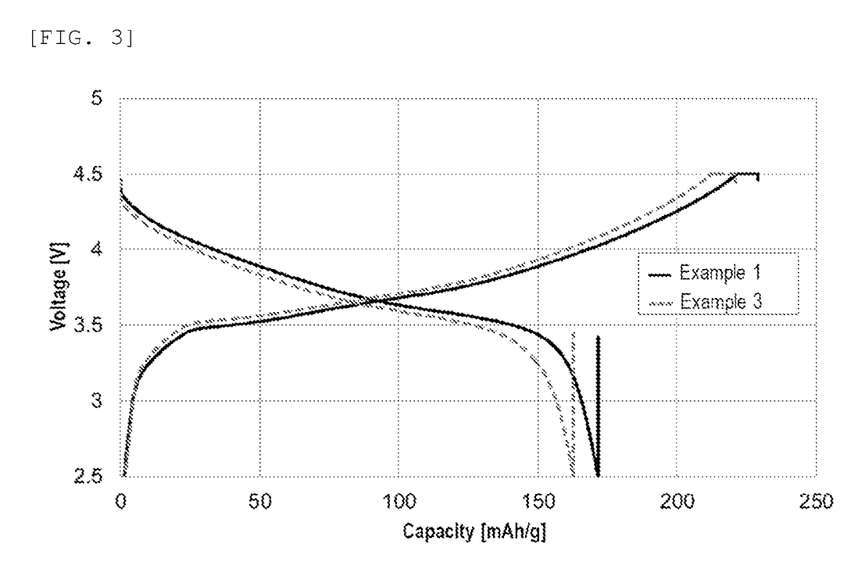
FIG. 3 is a diagram showing the results of battery evaluation (initial charge-discharge capacity characteristics) of an all-solid battery cell produced using a compound powder (sample) obtained in each of Examples 1 and 3.

The results of the initial charge-discharge capacity characteristics are shown in FIG. 3. The discharge capacity when discharged to 2.5 V at 0.1 C is 160 mAh/g or more. It can be considered that, since the solid electrolyte has a practicable ionic conductivity, a high discharge capacity can be exhibited.

TABLE 1

| | Compositional formula $Li_{7-x-7}PS_{6-x}Ha_{x-y}$ | x | y | Argyrodite phase $Li_{7-a}PS_{6-a}Ha_a$ | a | Contained phase other than argyrodite phase | Ionic conductivity ($10^{-2}$ S/cm) | Ratio of generation amount of hydrogen sulfide relative to argyrodite reference composition | XRD peak intensity ratio $Int(Li_3PS_4)/Int(Li_{7-a}PS_{6-a}Ha_a)$ | D50 (μm) |
|---|---|---|---|---|---|---|---|---|---|---|
| Example 1 | $Li_{5.0}PS_{4.4}Cl_{1.2}$ | 1.6 | 0.4 | $Li_{5.5}PS_{4.5}Cl_{1.5}$ | 1.5 | $Li_3PS_1$ | 3.82 | 0.88 | 0.069 | 2.31 |
| Example 2 | $Li_{4.6}PS_{4.4}Cl_{0.8}$ | 1.6 | 0.8 | $Li_{5.67}PS_{4.67}Cl_{1.33}$ | 1.33 | $Li_3PS_4$ | 1.49 | 0.69 | 0.091 | 2.20 |
| Example 3 | $Li_{4.2}PS_{4.4}Cl_{0.4}$ | 1.6 | 1.2 | $Li_6PS_5Cl$ | 1 | $Li_3PS_4$ | 0.24 | 0.62 | 0.191 | 2.98 |
| Comparative Example 1 | $Li_{5.4}PS_{4.4}Cl_{1.6}$ | 1.6 | 0 | $Li_{5.4}PS_{4.4}Cl_{1.6}$ | 1.6 | none | 6.6 | 1 | 0.031 | 2.45 |
| Comparative Example 4 | $Li_{5.6}PS_{4.4}Cl_{1.8}$ | 1.6 | −0.2 | $Li_{5.4}PS_{4.4}Cl_{1.6}$ | 1.6 | LiCl | 4.26 | 1.13 | 0.034 | 3.33 |

TABLE 2

| | Compositional formula $Li_{7-x-7}PS_{6-x}Ha_{x-y}$ | x | y | Argyrodite phase $Li_{7-a}PS_{6-a}Ha_a$ | a | Contained phase other than argyrodite phase | Ionic conductivity ($10^{-2}$ S/cm) | Ratio of generation amount of hydrogen sulfide relative to argyrodite reference composition | XRD peak intensity ratio $Int(Li_3PS_4)/Int(Li_{7-a}PS_{6-a}Ha_a)$ | D50 (μm) |
|---|---|---|---|---|---|---|---|---|---|---|
| Example 4 | $Li_{5.6}PS_{4.8}Cl_{0.9}$ | 1.2 | 0.3 | $Li_{5.84}PS_{4.84}Cl_{1.06}$ | 1.06 | $Li_3PS_4$ | 2.82 | 0.65 | 0.041 | 3.40 |
| Example 5 | $Li_{5.2}PS_{4.8}Cl_{0.6}$ | 1.2 | 0.6 | $Li_{6.14}PS_{6.14}Cl_{0.86}$ | 0.86 | $Li_3PS_4$ | 1.38 | 0.71 | 0.06 | 3.18 |
| Example 6 | $Li_{4.9}PS_{4.0}Cl_{0.3}$ | 1.2 | 0.9 | $Li_{6.45}PS_{5.45}Cl_{0.55}$ | 0.55 | $Li_3PS_4$ | 0.49 | 0.24 | 0.098 | 3.37 |
| Comparative Example 2 | $Li_{5.8}PS_{4.8}Cl_{1.2}$ | 1.2 | 0 | $Li_{5.8}PS_{4.8}Cl_{1.2}$ | 1.2 | none | 3.4 | 1 | 0.027 | 2.34 |

TABLE 3

| | Compositional formula $Li_{7-x-y}PS_{6-x}Ha_{x-y}$ | x | y | Argyrodite phase $Li_{7-a}PS_{6-a}Ha_a$ | a | Contained phase other than argyrodite phase | Ionic conductivity ($10^{-2}$ S/cm) | Ratio of generation amount of hydrogen sulfide relative to argyrodite reference composition | XRD peak intensity ratio $Int(Li_3PS_4)/Int(Li_{7-a}PS_{6-a}Ha_a)$ | D50 (μm) |
|---|---|---|---|---|---|---|---|---|---|---|
| Example 7 | $Li_{4.6}PS_{4.4}Cl_{0.4}Br_{0.4}$ | 1.6 | 0.8 | $Li_{6.67}PS_{4.67}Cl_{0.46}Br_{0.86}$ | 1.33 | $Li_3PS_4$ | 1.75 | 0.54 | 0.077 | 2.04 |
| Example 8 | $Li_{4.2}PS_{4.4}Cl_{0.2}Br_{0.2}$ | 1.6 | 1.2 | $Li_6PS_5Cl_{0.5}Br_{0.5}$ | 1 | $Li_3PS_4$ | 0.45 | 0.38 | 0.146 | 6.08 |
| Example 9 | $Li_{6.0}PS_{4.4}Cl_{0.6}Br_{0.6}$ | 1.6 | 0.4 | $Li_{5.5}PS_{4.5}Cl_{0.75}Br_{0.75}$ | 1.5 | $Li_3PS_4$ | 4.46 | 0.77 | 0.049 | 2.65 |
| Comparative Example 3 | $Li_{5.4}PS_{4.4}Cl_{0.8}Br_{0.8}$ | 1.6 | 0 | $Li_{6.4}PS_{4.4}Cl_{0.8}Br_{0.8}$ | 1.6 | none | 6.6 | 1 | 0.017 | 2.75 |

TABLE 4

| | Compositional formula $Li_{7-x-y}PS_{6-x}Ha_{x-y}$ | x | y | Argyrodite phase $Li_{7-a}PS_{6-a}Ha_a$ | a | Contained phase other than argyrodte a phase | Ionic conductivity ($10^{-2}$ S/cm) | Ratio of generation amount of hydrogen sulfide relative to argyrodite reference composition | XRD peak intensity ratio $Int(Li_3PS_4)/Int(Li_{7-a}PS_{6-a}Ha_a)$ | D50 (μm) |
|---|---|---|---|---|---|---|---|---|---|---|
| Comparative Example 5 | $Li_{3.8}PS_{4.4}$ | 1.6 | 1.6 | $L_7PS_4$ | 0 | $Li_3PS_4$ | 0.00481 | — | 1.344 | 3.47 |
| Comparative Example 6 | $Li_{4.6}PS_{4.8}$ | 1.2 | 1.2 | $Li_7PS_6$ | 0 | $Li_3PS_4$ | 0.0178 | — | 0.588 | 3.12 |
| Comparative Example 7 | $Li_3PS_4$ | 2 | 2 | none | | 2 $Li_3PS_4$ | 0.00346 | — | — | 5.66 |

(Consideration)

As a result of Rietveld analysis of the XRD data of the compound (sample) obtained in each of Examples 1 to 9, it can be confirmed that the compound having an argyrodite-type crystal structure, which contained $Li_{7-a}PS_{6-a}Ha_a$ (wherein Ha represented a halogen, and "a" satisfied 0.2<a≤1.8) having an argyrodite-type crystal structure, and $Li_3PS_4$, was contained in 30 mol % or more.

From the results of the XRD data obtained in each of Examples and Comparative Examples, in the $Li_3PS_4$ contained in the compound powder obtained in each of Examples 1, 2, 5, 7, and 9, the ratio of the β phase and the γ phase to the $Li_3PS_4$ was less than 65% in terms of molar ratio, and thus the $Li_3PS_4$ was a mixed phase of β-$Li_3PS_4$ and γ-$Li_3PS_4$.

On the other hand, in the $Li_3PS_4$ contained in the compound powder obtained in each of Examples 3, 4, and 6, the ratio of the γ-phase to the $Li_3PS_4$ was 65% or more in terms of molar ratio, and thus the $Li_3PS_4$ was a single phase (γ phase) of γ-$Li_3PS_4$.

Further, in the $Li_3PS_4$ contained in the compound powder obtained in Example 8, the ratio of the β-phase to the $Li_3PS_4$ was 65% or more in terms of molar ratio, and thus the $Li_3PS_4$ was a single phase (β phase) of β-$Li_3PS_4$.

From the results of the above Examples, Comparative Examples, and the tests carried out by the present inventors so far, it is found that by shifting the composition from the compositional formula of argyrodite-type crystal structure: $Li_{7-x}PS_{6-x}Ha_x$ (wherein Ha represented a halogen, and "x" satisfied 0.2<x≤1.8), $Li_3PS_4$ could be contained together with $Li_{7-a}PS_{6-a}Ha_a$ (wherein Ha represented a halogen, and "a" satisfied 0.2<a≤1.8); and by adjusting the content of the $Li_3PS_4$ within a predetermined range, the generation of hydrogen sulfide could be suppressed while securing the ionic conductivity.

From the above viewpoint, it is found that, when the solid electrolyte contained $Li_{7-a}PS_{6-a}Ha_a$ (wherein Ha represented a halogen, and "a" satisfied 0.2<a≤1.8) having an argyrodite-type crystal structure, and $Li_3PS_4$, and when, in an X-ray diffraction (XRD) pattern obtained through measurement by an X-ray diffraction method, the ratio of the peak intensity of a peak appearing at a position in a range of diffraction angle 2θ=26.0° to 28.8° derived from $Li_3PS_4$, relative to the peak intensity of a peak appearing at a position in a range of diffraction angle 2θ=24.9° to 26.3° derived from the argyrodite-type crystal structure, was 0.04 to 0.3, the generation of hydrogen sulfide could be suppressed while securing the ionic conductivity.

Also, from the results of the battery test, it can be confirmed that, when the solid electrolyte contained $Li_{7-a}PS_{6-a}Ha_a$ (wherein Ha represented a halogen, and "a" satisfied 0.2<a≤1.8) having an argyrodite-type crystal structure, and $Li_3PS_4$, and when, in an X-ray diffraction (XRD) pattern obtained through measurement by an X-ray diffraction method, the ratio of the peak intensity of a peak appearing at a position in a range of diffraction angle 2θ=26.0° to 28.8° derived from $Li_3PS_4$, relative to the peak intensity of a peak appearing at a position in a range of diffraction angle 2θ=24.9° to 26.3° derived from the argyrodite-type crystal structure, was 0.04 to 0.3, the solid electrolyte was effective as a solid electrolyte for a lithium secondary battery.

The invention claimed is:

1. A solid electrolyte comprising $Li_{7-a}PS_{6-a}Ha_a$, wherein Ha represents a halogen, and "a" satisfies 1.0<a≤1.8, having an argyrodite-type crystal structure, and $Li_3PS_4$, wherein, in an X-ray diffraction (XRD) pattern obtained through measurement by an X-ray diffraction method, the ratio of the peak intensity of a peak appearing at a position in a range of diffraction angle 2θ=26.0° to 28.8° derived from $Li_3PS_4$, relative to the peak intensity of a peak appearing at a position in a range of diffraction angle 2θ=24.9° to 26.3° derived from the argyrodite-type crystal structure, is 0.04 to 0.3.

2. The solid electrolyte according to claim 1, comprising a compound represented by a compositional formula: $Li_{7-x-y}PS_{6-x}Ha_{x-y}$, wherein Ha represents a halogen, and is Cl or Br, or a combination of both; when Ha is Cl alone, "x" satisfies 0.65<x≤1.8, and "y" satisfies −x/3+2/3<y<−x/3+

1.87 and y<x−0.2; and when Ha is Br alone or a combination of Cl and Br, "x" satisfies 0.2<x≤1.8, and "y" satisfies 0<y<−x/3+1.87 and y<x−0.2.

3. A lithium secondary battery comprising the solid electrolyte according to claim 1.

4. A lithium secondary battery comprising the solid electrolyte according to claim 1 and a negative electrode active material containing carbon or silicon.

5. A lithium secondary battery comprising the solid electrolyte according to claim 1 and a positive electrode active material containing lithium.

6. The solid electrolyte according to claim 1, wherein, in an X-ray diffraction (XRD) pattern obtained through measurement by an X-ray diffraction method, the ratio of the peak intensity of a peak appearing at a position in a range of diffraction angle 2θ=26.0° to 28.8° derived from $Li_3PS_4$, relative to the peak intensity of a peak appearing at a position in a range of diffraction angle 2θ=24.9° to 26.3° derived from the argyrodite-type crystal structure, is 0.04 to 0.2.

7. The solid electrolyte according to claim 1, wherein, in an X-ray diffraction (XRD) pattern obtained through measurement by an X-ray diffraction method, the ratio of the peak intensity of a peak appearing at a position in a range of diffraction angle 2θ=26.0° to 28.8° derived from $Li_3PS_4$, relative to the peak intensity of a peak appearing at a position in a range of diffraction angle 2θ=24.9° to 26.3° derived from the argyrodite-type crystal structure, is 0.04 to 0.1.

8. The solid electrolyte according to claim 1, comprising a compound represented by a compositional formula: $Li_{7-x-y}PS_{6-x}Ha_{x-y}$, wherein Ha represents a halogen, and is Br, or a combination of both Cl and Br, and when Ha is Br alone or a combination of Cl and Br, "x" satisfies 0.2<x≤1.8, and "y" satisfies 0<y<−x/3+1.87 and y<x−0.2.

9. The solid electrolyte according to claim 1, wherein a D50 in a volume-based particle size distribution obtained via measurement by a laser diffraction scattering-type particle size distribution measurement method is 0.1 to 10 μm.

10. The solid electrolyte according to claim 1, wherein two or three of $\alpha$-$Li_3PS_4$, $\beta$-$Li_3PS_4$, and $\gamma$-$Li_3PS_4$ are contained.

* * * * *